J. A. KEESEY.
GUIDE AND SUPPORT FOR SIGNAL RODS.
APPLICATION FILED NOV. 13, 1916.
1,251,239.
Patented Dec. 25, 1917.
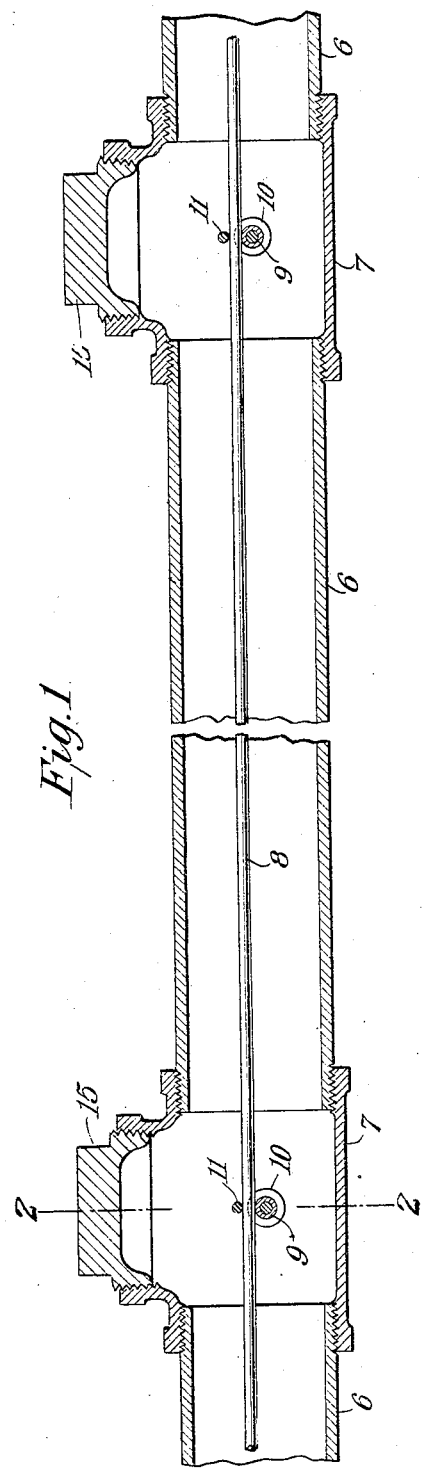
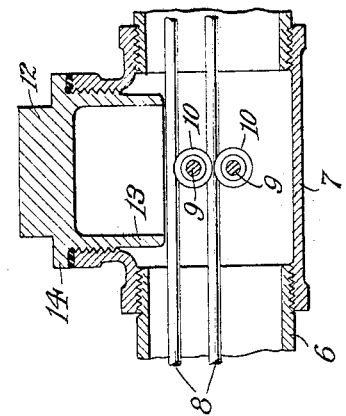
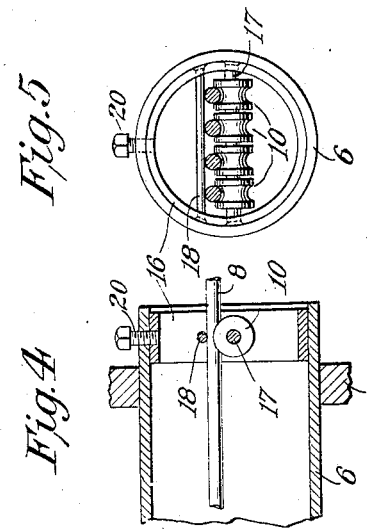
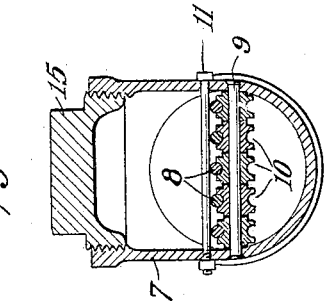
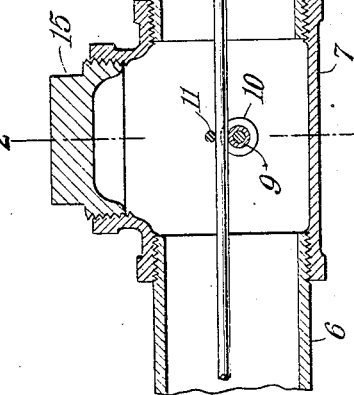
Inventor
John Arthur Keesey
By his Attorney
Alfred Shedlock.

UNITED STATES PATENT OFFICE.

JOHN ARTHUR KEESEY, OF BROOKLYN, NEW YORK.

GUIDE AND SUPPORT FOR SIGNAL-RODS.

1,251,239.          Specification of Letters Patent.      Patented Dec. 25, 1917.

Application filed November 13, 1916. Serial No. 131,130.

*To all whom it may concern:*

Be it known that I, JOHN ARTHUR KEESEY, a citizen of the United States, residing at Brooklyn, county of Kings, and State of New York, have invented a new and useful Guide and Support for Signal-Rods, of which the following is a specification.

This invention relates to mechanical signaling and pertains particularly to means for supporting and controlling the operating rods. Generally, heretofore a number of such rods have, in a bunch, been placed in a containing tube or pipe, which, when applied to a signal system on ships extend between the bulkheads often a distance of two or more hundred feet. Each rod constitutes a connection between signaling devices, or parts of signaling devices, located on the bridge and in the engine room, or at the bow and stern of the ship. Under the present practice of placing a number of rods in a containing tube they lie in contact with one another along the lower part of the tube, and such an arrangement, besides offering considerable resistance in operating the rods, due to contact friction between the rods, is often the cause of trouble in operating the signaling devices, necessitating a complete overhauling of the signaling system. Besides considerable difficulty is experienced, and time spent, in selecting at the ends of the containing tube the individual rod required to connect the various signaling devices or parts of signaling devices at the ends of the system.

This invention has for its object to facilitate the disposition of signal rods in containing tubes, to reduce resistance in operating the rods by practically eliminating all surface sliding friction, to facilitate the selection of the ends of each individual rod for connection to the proper signaling device, and to afford a ready means for examination of the rods and making repairs when necessary.

These important features are accomplished by providing anti-friction rollers at suitable intervals throughout the length of rod containing tubes adapted to hold and guide the signal rods. These rollers are preferably located in boxes or receptacles provided with water-tight closures and included in and forming parts of the containing tubes. For this purpose ordinary commercial T's are found well adapted with the main part of the containing tube consisting of ordinary iron pipe.

Two or more sets of transversely arranged rollers may be used when one set is insufficient to hold all the rods in a containing tube. Means are provided for retaining the rods in or on the rollers. When two or more sets are used then an upper set will act to hold the rods in the set immediately beneath it. The rods may be held in the upper set or in a single set, when only one set is used, by a bar extending transversely across the box. The closure of the box, which may be a screw plug, may be formed to extend sufficiently downwardly in the T to act as a retainer for the rods in the rollers.

These with certain other features and modifications in construction will now be fully described by reference had to the accompanying drawings, in which:

Figure 1, represents in longitudinal section a portion of a signal rod containing tube and two guide and supporting roller boxes.

Fig. 2, is a transverse section on line 2, 2, Fig. 1.

Fig. 3, a similar section showing two sets of signal rods supporting rollers.

Fig. 4, a longitudinal sectional view of a modification, showing a complete signal rod guide and supporting device adapted to be applied to a rod containing tube, and Fig. 5, an end view of the same.

The signal rods containing tube is shown consisting of ordinary wrought iron pipe 6, and T's 7, connecting lengths of pipe at suitable intervals. As applied to ships the tube extends between and passes through the bulkheads adjacent the locations between which signals are to be transmitted, as for instance the bridge and engine room. At such bulkheads suitable means are provided for imparting and transmitting action to and from the signaling devices located at the stations of communication through the medium of the signal rods 8. These connecting means are not shown as they form no part of the present invention.

Each T has a fixed transversely arranged shaft 9, on which are fitted to rotate a series of grooved rollers 10, in which the signal rods 8, rest. These rods 8, are passed or drawn through the tube 6, and as their ends reach each T box they are placed in or on the rollers 10, and are held therein, as shown in Figs. 1 and 2 by detachable bars 11, passed through the side walls of the T's after the rods are properly located in the rollers. These retaining bars may be of any suitable character, as bolts and nuts, as shown in Fig. 2 or the closure cap 12, may have a downwardly extending flange 13, adapted to hold the rods 8, in place. In this case the closure will have a flange 14, between which and the opening of the T a suitable packing ring will be placed, as shown in Fig. 3. In other cases the closures may consist of ordinary plugs 15, as shown in Figs. 1 and 2.

The signal rods guide supports may be made as separate devices adapted to be applied to any existing signal rods containing tubes; such a device is shown in Figs. 4 and 5, consisting of thin band ring 16, with a fixed cross shaft 17, on which rollers 10 are held and a retaining bar 18, also fastened in the ring. These devices when placed in a tube, as for instance near a bulkhead 19, may be retained in place by a small screw 20, passed through the tube 6, into the ring 16.

When a greater number of signal rods 8, are employed than can be conveniently carried on one set of rollers 10, it is proposed to use a plurality of sets of rollers, carried on fixed shafts, arranged in the boxes in vertical transverse planes. Such an arrangement is illustrated in Fig. 3. In this view two sets of rollers are shown carried on two bearing shafts 9, the rollers of the upper set acting as retainers to hold the rods 8 in the rollers of the lower set. The retainer for the rods 8, in the upper set of rollers is the downwardly extending flange 13, of the screw plug 12. The features illustrated in Fig. 3, are included in the subject matter of an application for Letters Patent filed by me June 14, 1917, Serial No. 174,703.

It will be understood that the before described improvements in signaling apparatus may be used in other signaling systems than here specifically described, as for instance on railroads.

I claim:

1. A guide and support for signal rods, comprising a containing tube, bearing bars transversely located in and at intervals throughout the length of the tube, guide rollers on the bearing bars adapted to control and support individual signal operating rods and means for retaining the rods in operative position on the rollers.

2. A guide and support for signal rods, comprising a rod container consisting of lengths of pipe connected by boxes or receptacles, rollers located in the boxes adapted to guide and support signal operating rods, and means for retaining the rods in operative position on the rollers.

3. A guide and support for signal rods, comprising a containing tube, transversely arranged bearing bars located therein, at intervals throughout its length, guide rollers on the bearing bars adapted to control and support signal operating rods and detachable bars located over the rollers to hold the rods in operative positions.

4. A guide and support for signal rods, comprising a containing tube, bearing bars transversely located therein at intervals throughout its length, grooved guide rollers on the bearing bars adapted to control and support signal operating rods, retaining bars located above and adapted to hold the signal rods in the rollers and means for securing the bearing bars and retaining bars in parallel positions.

5. A guide and support for signal rods, comprising a rod container consisting of lengths of pipe connected by T fittings provided with closing plugs, rollers located in the T's adapted to guide and support signal operating rods, bearing bars transversely held in the T's and on which the rollers are fitted to rotate and means for retaining the signal rods in operative positions on the rollers.

Signed at New York, county and State of New York, this 8th day of November, 1916.

JOHN ARTHUR KEESEY.

In the presence of—
JAMES A. HUDSON,
ALFRED SHEDLOCK.

Copies of this patent may be obtained for five cents each, by addressing the "Commissioner of Patents, Washington, D. C."